Figure 1:
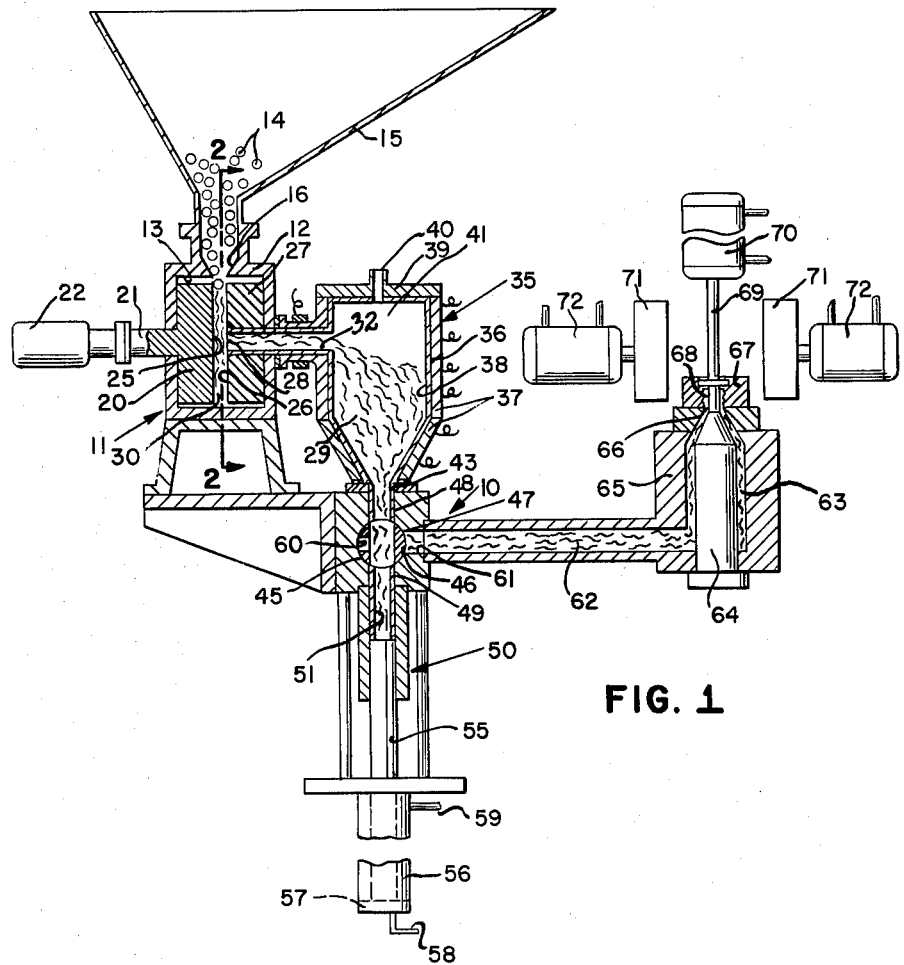

June 21, 1966     H. G. STENGER     3,256,568

MODIFIED PLASTICIZER SYSTEM

Original Filed Dec. 8, 1960

HANS G. STENGER
*INVENTOR.*

BY
SPENCER L. BLAYLOCK, JR.
and
WILBUR A. SCHAICH
ATTORNEYS

United States Patent Office 3,256,568
Patented June 21, 1966

3,256,568
MODIFIED PLASTICIZER SYSTEM
Hans G. Stenger, Lambertville, Mich., assignor to Owens-Illinois Glass Company, a corporation of Ohio
Filed June 10, 1963, Ser. No. 286,723
4 Claims. (Cl. 18—30)

This application is a continuation of application Serial No. 74,664, filed December 8, 1960, and now abandoned.

The present invention relates to an apparatus for making plastic articles. More particularly the present invention relates to an apparatus for making a plastic article from plasticized material supplied by an elastic melt extruder and at a forming pressure different from that generated in the extruder.

There has been recently developed a new type of plasticizer-extruder, commonly known as an "elastic melt extruder" utilizing "the normal force effect," i.e. the normal force developed when a visco-elastic material is sheared between a rotating plate and a stationary plate, to perform the functions of a conventional plasticizer-extruder. Such an elastic melt extruder is described in detail in "Modern Plastics Magazine" of October 1959, at page 107, in an article by Bryce Maxwell and Anthony J. Scalora.

Such an elastic melt extruder utilizes a power-driven, rotatable disc operable within a convolute chamber to which solid plastic material is furnished from a supply hopper or the like. A radial face of the disc is spaced through a narrow gap from the corresponding face of an orifice plate having an exit orifice axially aligned with the disc. As the disc is rotated, the thermoplastic material introduced peripherally of the disc and confined between the radial shearing faces of the disc and the orifice plate is subjected to shearing forces. The thermoplastic material is essentially elastic and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

The elastic melt extruder thus provides an extremely simple and efficient method of and apparatus for plasticizing solid plastic material. However, such extruders are not readily adaptable to injection molding processes, or to processes in which injection molding steps are performed in conjunction with other extrusion, blow molding or similar forming steps, due to the low output pressure of about one hundred to one hundred fifty pounds per square inch.

The present invention proposes the utilization of an elastic melt extruder in a plastic forming apparatus, and including an injection molding step, by utilizing the elastic melt extruder as a source of plasticized material, accumulating the plasticized material and retaining it in a state of plasticization, and injection molding or otherwise forming the plasticized material into a desired article by the subjection of the accumulated plasticized material to a forming pressure derived from a pressure source from the elastic melt extruder. In other words, plasticized material from the elastic melt extruder is accumulated and finally formed by subjecting a portion of the material to a forming pressure different from the pressure developed in the shearing zone of the extruder.

The specific apparatus illustrated in the accompanying drawings and hereinafter described in detail, adapts this process to the manufacture of blow molded articles such as containers or the like which have an injection molded portion, such as a container neck finish. Obviously the method and apparatus may be equally well adapted to an injection molding process or an extrusion process at which the final forming step is carried out a temperature distinct from that developed within the elastic melt extruder.

It is, therefore, an important object of the present invention to provide an improved apparatus for forming plastic articles by plasticizing plastic material in an elastic melt extruder, accumulating the plasticized material and then forming the plasticized material at a pressure distinct from that developed during the plasticizing of the material.

A further object of this invention is to provide an improved apparatus for the formation of plastic articles including an elastic melt extruder, an accumulator receiving plasticized material from the extruder, means for segregating a portion of the accumulated material, and means for subjecting the segregated material to a forming pressure independent of the pressure developed within the extruder.

Other objects of this invention will appear in the following description and appended claims, reference being had to the accompanying drawings forming a part of this specification wherein like reference characters designate corresponding parts in the several views.

Figure 2:
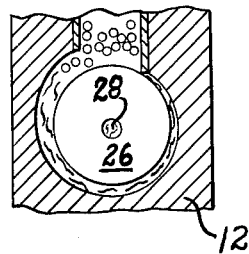

On the drawings:

FIGURE 1 is a schematic representation of an apparatus of the present invention capable of carrying out the method of the present invention; and FIGURE 2 is a sectional view taken along the plane 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to an apparatus of the present invention and includes an elastic melt extruder indicated generally at 11.

The elastic melt extruder 11 comprises a casing 12 enclosing a convolute chamber 13 adapted to receive particulate plastic material 14 from an overhead hopper 15 through an inlet passage 16.

Disposed interiorly of casing 12 and within the convolute chamber 13 is a shear disc 20 having a rearwardly extending drive shaft 21 driven by a suitable means, such as a motor 22, which may be either an electric motor or a hydraulic motor.

The rotatable shearing disc 20 is provided with a front shearing face 25 which extends radially across the interior of the chamber 13 and which is closely spaced from a second shearing face 26 provided by a fixed shear plate 27, also disposed within the chamber 13 and provided with a central outlet orifice 28.

In accordance with its conventional operation, the elastic melt extruder 11 will plasticize the particulate material 14 introduced through the inlet 16 into the gap 30 which forms a shearing zone. The relative rotation of the faces 25 and 26 will effect the flow through the orifice 28 of plasticized material 29. This material 29 from the shearing zone 30 flows through a connecting conduit 32 into an upper accumulator 35. This accumulator 35 includes a peripheral casing 36 provided with heat exchange means, such as electric resistance heating elements 37, surrounding an interior accumulation space or chamber 38 to maintain plasticized material 32 introduced thereinto in plasticized condition.

The chamber 38 is closed at its upper open end by a cover plate 39 carrying a fluid pressure conduit 40 connected to a source of fluid under pressure, such as compressed air, and communicating with the air space 41 over the body 42 of plasticized material within the chamber 38.

The accumulator chamber 38 communicates through a lower outlet opening 43 with a valve block 45 having rotationally journalled therein a rotary valve 46. The valve 46 is provided with a diametrically extending first passage 47 registering with valve block passages 48 and 49 to establish communication between the accumulator outlet opening 43 and a lower, tubular accumulator 50.

Material from the upper accumulator chamber 38 will thus be displaced by fluid under pressure in the space 41 downwardly through the valve block passages 48 and 49 and the valve element passage 47 into the lower internal accumulator space 51 provided by the lower accumulator 50.

The open lower end of the tubular lower accumulator 50 is closed by a plunger 55 which forms the piston rod of a fluid pressure actuated cylinder 56 having an internal, vertically displaceable piston 57 adapted to be moved therein by fluid under pressure introduced through fluid pressure conduits 58 and 59, alternately connectable to a source of fluid under pressure.

The rotary valve body 46 is provided with a second radial port 60 which intersects the diametric bore 47 and which is alignable with the lower accumulation chamber 51 upon rotation of the valve element 46 counterclockwise through an arc of 90° from its illustrated position. Upon such rotation of the valve 47, communication between the lower accumulation chamber 51 and the upper accumulation chamber 38 is interrupted and plasticized material 42 from the upper plasticizing chamber is segregated from the material in the upper chamber. Additionally, such rotation of the valve 46 places the diametric valve passage 47 in communication with a transverse passage 61 in the valve body 45, this passage 61 opening into a conduit 62 communicating with a tubular extrusion passage 63 defined between an upstanding extrusion mandrel 64 and a surrounding orifice block 65, the passage 63, in turn, communication with an orifice 66.

Superimposed over this orifice 66 is an injection mold 67 having an interior mold space 68 communicating with the orifice 66. The injection mold 67 is carried by the piston rod 69 of a mold actuating cylinder 70. Upon actuation of the cylinder 70, the injection mold 67 is withdrawn from the orifice 66 and, assuming the flow of plasticized material through the orifice, a vertically extending tube will be formed for subsequent enclosure within a pair of blow molds 71 actuatable into closed relation on the tube by means of actuating cylinders 72.

The arrangement of orifice block 65, orifice 66, mold 67, blow molds 71 and the actuating cylinders 70 and 72 is substantially the same as that disclosed in the copending application of Richard C. Allen and Leon E. Elphee, Serial No. 797,276, now Patent No. 3,008,192, filed in the United states Patent Office on March 4, 1959, and assigned to the assignee of the present invention.

OPERATION

The operation of the above-described apparatus to carry out the method of the present invention will be readily appreciated.

Particulate material 14 fed from the hopper 15 through the inlet chamber 16 and into the shearing zone 30 is readily plasticized in the shearing chamber 30 defined between the rotatable shearing face 25 of the disc 20 and the fixed shearing face 26 of the shearing plate 27. Such plasticized material 29 is then introduced through the conduit 32 into the upper accumulation chamber 38 under the outlet pressure of the plasticizer 11. The accumulating chamber 38 is heated by the heating elements 37 in order to maintain the material in plasticized condition therein, and such material is preferably maintained under superatmospheric pressure by means of air or similar fluid introduced thereinto through conduit 40.

The plasticized material 42 within the chamber 38 flows downwardly through the valve passage 47 into the lower accumulation chamber 51. Upon rotation of the valve 46 to interrupt communication between the accumulation chambers 38 and 51, the valve passage 60 establishes communication between the lower accumulation chamber 51 and the conduit 62 leading to the orifice 66. Upon actuation of the pressure-applying cylinder 56 by the introduction of fluid under pressure through the conduit 58, the piston rod 55 is elevated under the pressure of the cylinder 56. Resultant movement of the plunger 55 into the lower accumulation chamber displaces material therefrom into the extrusion passage 63 and through the orifice 66 into the mold cavity 68 of the injection mold 67. Following filling of the mold, the material in the passages 61, 62 and 63 is maintained at the molding pressure of the plunger 55, the plunger being bottomed on the material. After solidification of material within the mold cavity 68, the mold 67 is preferably elevated by actuation of the cylinder 70 to accommodate the extrusion through the orifice 66 of a tube integral with the material filling the mold cavity 68. The extrusion also is accomplished under pressures generated by the plunger 55. Subsequently, this extruded tube is enclosed within the blow mold 70 and is inflated therein by air introduced through the injection mold 67 to a final blown configuration.

Thus, it will be seen that the present invention makes possible the utilization of an elastic melt extruder in an injection molding or extrusion process requiring forming pressures in excess of those generated within the shearing zone of the elastic melt extruder. By accumulating the output of the elastic melt extruder, the efficient, continuous plasticizing characteristics of the elastic melt extruder are fully utilized, and by utilizing an external source of pressure as the forming pressure for the plasticized material, the possibility of utilizing such a plasticizer in an efficient manner is realized.

Having thus described my invention, I claim:

1. An apparatus for injection molding a plastic article comprising an injection mold, an elastic melt extruder having spaced relatively rotatable plates defining therebetween an internal shearing zone, an accumulation chamber receiving material from said shearing zone at a predetermined, relatively low pressure, valve means interposed between said accumulation chamber and the mold for (1) segregating a portion of the accumulated material while preventing chamber-mold communication, and (2) accommodating chamber-mold communication while preventing communication between said segregated material and said chamber, and a power-displaceable piston for displacing the segregated material toward the mold at a pressure greater than and independent of the predetermined pressure developed within said shearing zone.

2. In an apparatus for intermittently issuing plasticized material from an orifice, a continuously running elastic melt extruder having relatively rotatable plates defining therebetween an internal shearing zone from which plasticized material is constantly issued at a first relatively low pressure, a first accumulation chamber always receiving material from said shearing zone, a second accumulation chamber interposed between said first chamber and said orifice, valve means interposed between the chambers and between said second chamber and said orifice, respectievly, said valve means being operable to alternatively (1) interconnect said chambers while isolating both said chambers from said orifice and (2) isolate said chambers from one another while interconnecting only said second chamber and said orifice, and power means operable only when said valve means is operable as at (2) above for expressing material from the second chamber through the orifice at a pressure different from and greater than the pressure developed within said shearing zone.

3. An apparatus for issuing separate and successive plastic charges through a forming orifice comprising an elastic melt extruder having an internal shearing zone from which plasticized material issues continuously and at a relatively low pressure through an outlet, an accumulator receiving material from said outlet, means defining a cylindrical chamber for receiving material from said accumulator, a double acting fluid pressure actuated cylinder having a piston movable in said chamber to subject material in said chamber to a pressure independent of the pressure developed within said shearing zone and independent of any pressure developed in said accumulator, and valve means for (1) initially interconnecting said accumulator and said chamber while isolating both said chamber and said accumulator from said orifice, actuation of said cylinder to retract said piston in said chamber filling said chamber with a charge of material from said accumulator, and (2) subsequently interconnecting the chamber and said orifice while isolating said chamber from said accumulator, so that said piston is effective upon actuation of said cylinder to advance the piston in said chamber and express material from said chamber through said orifice.

4. An apparatus for forming successive plastic articles in a forming apparatus comprising an elastic melt extruder having an internal shearing zone from which plasticized material issues continuously and under relatively low pressures through an outlet orifice, an accumulator receiving material from said orifice, means defining a chamber in which successive portions of material from the accumulator are segregated from material remaining in said accumulator, power means for subjecting the portions of segregated material in said chamber to a pressure derived from a source independent of the pressure developed within said shearing zone and independent of any pressure developed in said accumulator and a single multi-passage valve structure for (1) initially interconnecting said accumulator and said chamber to provide a charge of material isolated from the orifice and (2) subsequently interconnecting the chamber and said orifice while isolating said chamber from said accumulator, so that said power means is effective to separately and successively displace said successive portions of said segregated material from said chamber into said forming apparatus.

References Cited by the Examiner

UNITED STATES PATENTS 2,207,426    7/1940    Bailey.

FOREIGN PATENTS 568,274    6/1958    Belgian.

OTHER REFERENCES

Plastics Engineering, pages 107–114 and 202–210, October 1959.

J. SPENCER OVERHOLSER, *Primary Examiner.*

MICHAEL V. BRINDISI, *Examiner.*

W. L. MCBAY, *Assistant Examiner.*